Jan. 5, 1965 R. S. HOOPER 3,164,337
JET AIRCRAFT WITH ORIENTABLE NOZZLES
FOR VERTICAL OR FORWARD MOVEMENT
Filed Sept. 29, 1959 2 Sheets-Sheet 1
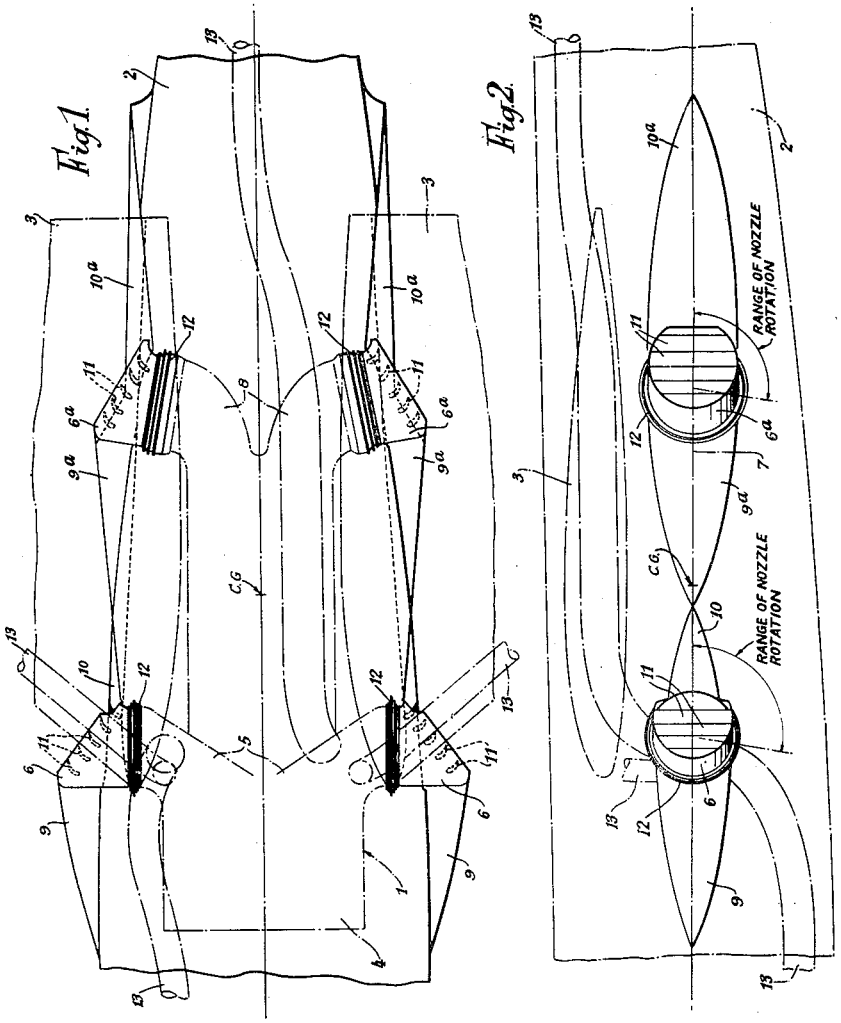
Inventor
Ralph Spenser Hooper
By Stevens Davis Miller & Mosher
Attorneys Inventor
Ralph Sponser Hooper United States Patent Office 3,164,337
Patented Jan. 5, 1965

3,164,337
JET AIRCRAFT WITH ORIENTABLE NOZZLES
FOR VERTICAL OR FORWARD MOVEMENT
Ralph Spenser Hooper, Hampton Hill, England, assignor to Hawker Aircraft Limited, Kingston-upon-Thames, Surrey County, England, a British company
Filed Sept. 29, 1959, Ser. No. 843,302
2 Claims. (Cl. 244—12)

This invention relates to aircraft of the fixed wing type propelled by means of one or more gas turbines.

Although applicable to commercial aircraft, the invention is particularly concerned with high speed service aircraft having comparatively high wing loadings.

Such aircraft are often required to operate from comparatively short landing strips or small aerodromes or from aerodromes situated at high altitudes or, in the case of carrier-borne aircraft, have to operate from the comparatively short deck of an aircraft carrier, and consequently the problem with which the aircraft designer is confronted is to design an aircraft which will fulfil the requirements as regards speed, rate of climb, etc., and at the same time shall be capable of taking off and landing in the space available. Auxiliary braking devices, such as braking parachutes, are now commonly used to reduce the length of the landing run, but to decrease the take-off run it is necessary to employ either auxiliary rocket motors, or in the case of carrier-borne aircraft, a steam or other type of catapult.

The chief object of the present invention is to evolve an aircraft propelled by a gas turbine wherein the whole of the available thrust can be directed rearwardly for forward propulsion or downwardly to produce upward lift with or without forward motion.

A further object of the invention is to so arrange the gas turbine on the aircraft that when used for vertical take off and landing the downward thrust available will be balanced fore and aft of the centre of gravity of the aircraft, the centres of thrust being situated fairly close to the centre of gravity to maintain the length of the moment arm a a minimum.

The gas turbine employed in carrying out the present invention is of the kind wherein only a part of the compressed air passes to the combustion chambers, the bulk of the air which is compressed being available to produce a downward thrust for vertical take off, forward of the centre of gravity of the aircraft.

An aircraft in accordance with the present invention has a gas turbine mounted within the fuselage at or about the centre of gravity of the aircraft and has associated therewith a pair of nozzles situated forward of the centre of gravity and a second pair of nozzles situated aft of the centre of gravity, the nozzles comprising each pair projecting from the fuselage on opposite sides, the forward pair of nozzles discharging air bled from the compressor of the gas turbine, the aft pair of nozzles discharging efflux gases from the turbine, the nozzles being mounted for simultaneous orientation, whereby the whole volume of air and efflux gases discharged from the four nozzles can be directed rearwardly and used for forward propulsion or directed downwardly to produce vertical lift.

Referring to the accompanying drawings:

FIGURE 1 is a fragmentary plan view of an aircraft having a gas turbine and nozzles arranged in accordance with the invention;

FIGURE 2 is a side elevation;

Figure 3:
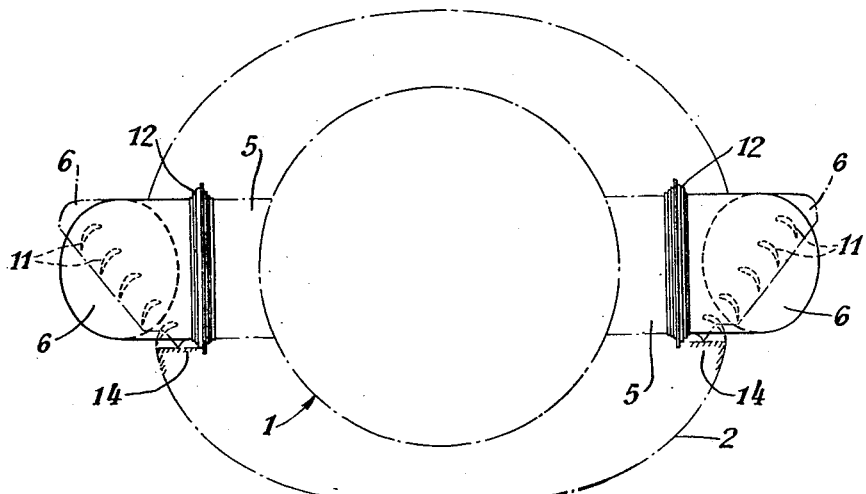
FIGURE 3 is a sectional view looking rearwardly and showing the two forwardly positioned nozzles.

The invention is shown applied to a single engine aircraft of the shoulder wing type, the gas turbine indicated generally by reference numeral 1 being mounted within the fuselage 2 at or about the centre of gravity of the aircraft, the approximate position of the centre of gravity being indicated in FIGURES 1 and 2, the wing of the aircraft being indicated by reference numeral 3.

The compressor casing 4 of the gas turbine has two branch passages 5 leading to two nozzles 6 projecting from the fuselage on opposite sides forward of the centre of gravity of the aircraft and from which air bled from the compressor is discharged. As shown clearly in FIGURE 2 nozzles 6 are preferably situated on the longitudinal datum line 7 of the aircraft containing the centre of gravity.

The gases from the turbine pass through a short bifurcated jet pipe 8 to two further nozzles 6a through which the products of combustion are discharged.

Nozzles 6 are arranged slightly outboard of nozzles 6a, fairings 9 and 9a being arranged respectively in front of nozzles 6 and 6a for drag reduction during forward flight. The fuselage immediately behind the forward and aft nozzles is formed with rearwardly directed recesses 10 and 10a for guiding the air and exhaust gases rearwardly during forward flight.

In order to turn the issuing air and exhaust gases through an angle of substantially 90° the nozzles are provided with internally positioned spaced guide vanes 11.

Nozzles 6 and 6a are connected with passages 5 and bifurcated jet pipe 8 by annular pipe couplings 12 which permit orientation of the nozzles about their axes through an angle of a little more than 90°, although this angle may be increased if desired to approximately 180° to provide a forwardly directed thrust for braking purposes. Orientation of the four nozzles is simultaneous by suitable operating mechanism under the control of the pilot.

Figure 4:
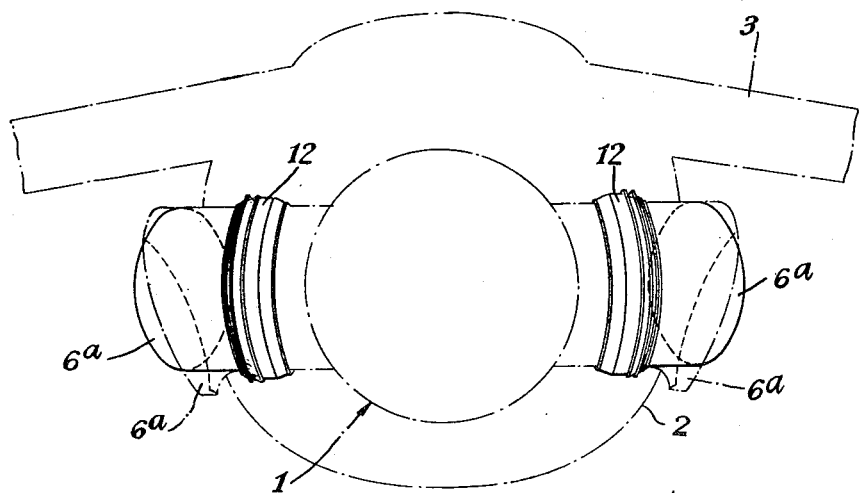
FIGURE 4 is a similar view to FIGURE 3 but showing the two aft nozzles.

The drawings show by full lines the position of the nozzles for forward propulsion, the position assumed by the nozzles for vertical take off or hovering being indicated by dotted lines in FIGURES 3 and 4.

To stabilize the aircraft during vertical take off and at other times when the control surfaces are ineffective, downwardly directed control nozzles are provided at or near the nose and tail and at the wing tips and air is bled to these nozzles from the compressor through branch pipes 13.

To enable sufficient air to be bled from the compressor to the stabilizing nozzles, nozzles 6 are positioned as is shown in FIGURE 3, whereby parts of nozzles 6 will be blanked off by parts 14 of the fuselage when nozzles 6 are situated in the dotted line position. Any loss in downward thrust from nozzles 6 as a result of such blanking off will be compensated for by the stabilizing effect of the front stabilizing nozzles situated at or near the nose of the aircraft.

The stabilizing control nozzles will be brought into operation at any speed when the flying control surfaces are ineffective and may during a steep angle landing approach be used to maintain the aircraft in an attitude which would enable the pilot to obtain an unrestricted view of the landing area.

As is shown clearly in FIGURES 1 and 2 the four nozzles 6 and 6a are positioned around the periphery of the wing at the root thus minimising the "ground suction effect" normally present on jet borne vertical take off aircraft when in close proximity to the ground.

The shoulder wing preferably employed has a fairly pronounced anhedral angle whereby the centre of thrust from the four nozzles can be arranged to pass through the centre of drag when in their forward propulsion position.

With the ducted fan or bypass type turbojet unit proposed the entire engine thrust can be used effectively for both forward propulsion and vertical lift.

Furthermore although it is proposed that the nozzles shall be oriented into either of two positions for vertical take off and landing or for forward flight and possibly a third position to provide a braking effect, it is within the scope of the invention to utilize them to give a steep angle of take off or landing approach by directing them both rearwardly and downwardly.

Any suitable means may be used for simultaneously orienting the nozzles such as pneumatic, hydraulic, electric or mechanical means under the control of the pilot and orientation of the nozzles to produce a downward thrust may be arranged to bring the stabilizing nozzles into operation automatically.

I claim:

1. An aircraft having a fuselage, a wing, other normal flying control surfaces and a gas turbine including a compressor within said fuselage at about the center of gravity of the aircraft and having mounted thereon a pair of nozzles situated forward of the center of gravity and a second pair of nozzles situated aft of the center of gravity, the forward and aft pairs of nozzles being disposed at about the same distance from the center of gravity, the nozzles comprising each pair projecting from the fuselage on opposite sides thereof disposed around the periphery of said wing for the purpose of minimizing ground suction effect during vertical takeoff or when hovering near the ground, the forward pair of nozzles discharging air from the compressor of the gas turbine, the aft pair of nozzles discharging efflux gases from the gas turbine, means mounting the nozzles for simultaneous orientation, whereby the whole volume of air and efflux gases discharged fom the four nozzles can be directed rearwardly when used for forward propulsion or directed downwardly to produce vertical lift.

2. An aircraft having a fuselage and normal flying control surfaces, and a gas turbine including a compressor mounted within said fuselage at about the center of gravity of the aircraft and having mounted thereon a pair of nozzles situated forward of the center of gravity and a second pair of nozzles situated aft of the center of gravity, the forward pair of nozzles discharging air bled from the compressor of said gas turbine, the aft pair of nozzles discharging efflux gases from the gas turbine, means for mounting the nozzles for simultaneous orientation whereby the whole volume of air and efflux gases discharged from the four nozzles can be directed rearwardly and used for forward propulsion or directed downwardly to produce vertical lift, and valve controlled downwardly directed jet orifices at the tips of said wings and at or near the nose and tail of said aircraft for stabilizing purposes when the normal flying control surfaces are ineffective, the jet orifices being connected with the compressor casing by means of suitable pipes, means on the fuselage whereby part of the discharge area of the forward pair of nozzles will be blanked off when said nozzles are oriented into a downwardly directed position and said jet orifices are in operation.

References Cited by the Examiner
UNITED STATES PATENTS

| | | | |
|---|---|---|---|
| 2,857,740 | 10/58 | Hall | 60—35.55 |
| 2,870,978 | 1/59 | Griffith | 244—23 |
| 2,879,014 | 3/59 | Smith et al. | 244—12 |
| 2,885,159 | 5/59 | Ashwood | 244—12 |
| 2,912,188 | 11/59 | Singelmann et al. | 244—12 |
| 2,933,891 | 4/60 | Britt | 244—23 X |

FOREIGN PATENTS 226,135    7/58    Australia.

FERGUS S. MIDDLETON, *Primary Examiner.*

ARTHUR M. HORTON, MILTON BUCHLER,
*Examiners.*